Jan. 19, 1965  W. D. STRICKLAND  3,166,102
ARMATURE WINDING MACHINE
Filed Oct. 4, 1962  2 Sheets-Sheet 1
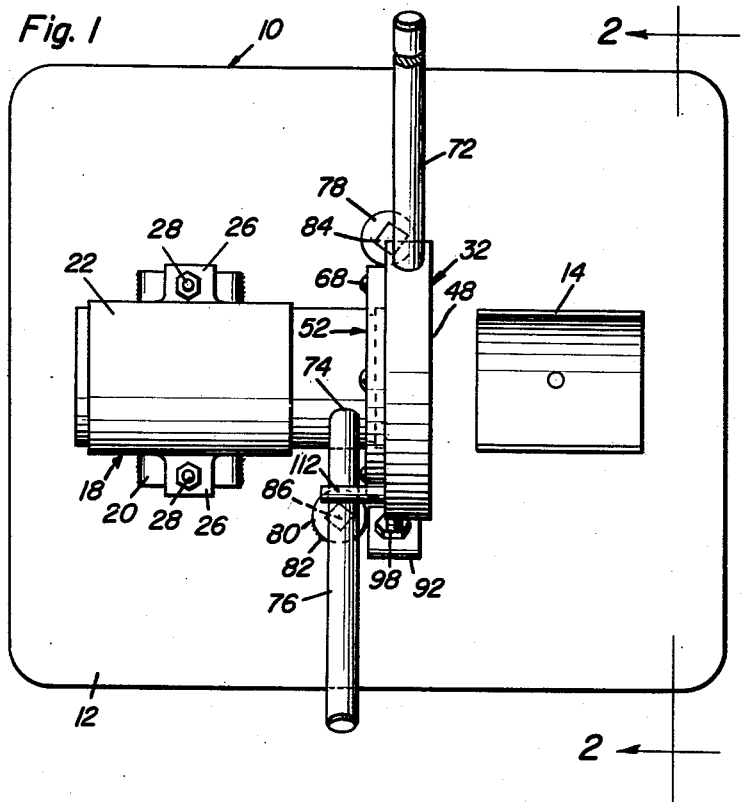
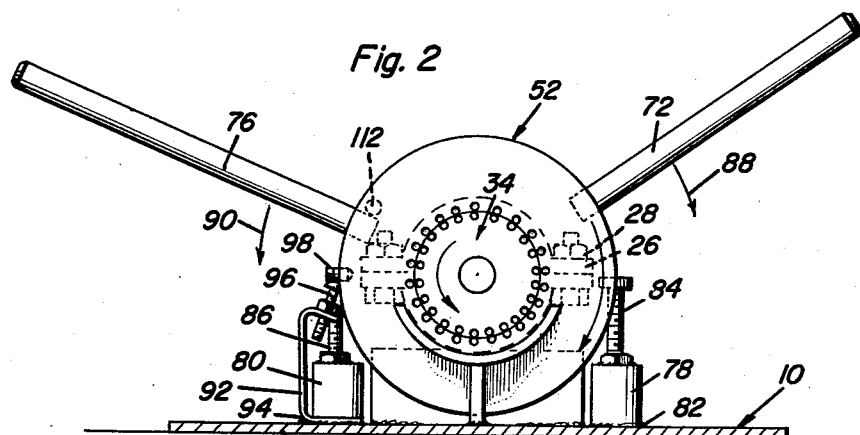
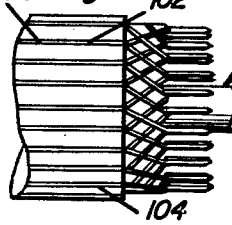
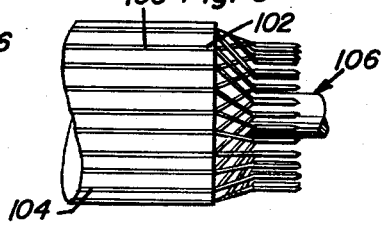
Willie D. Strickland
INVENTOR.
BY
Attorneys

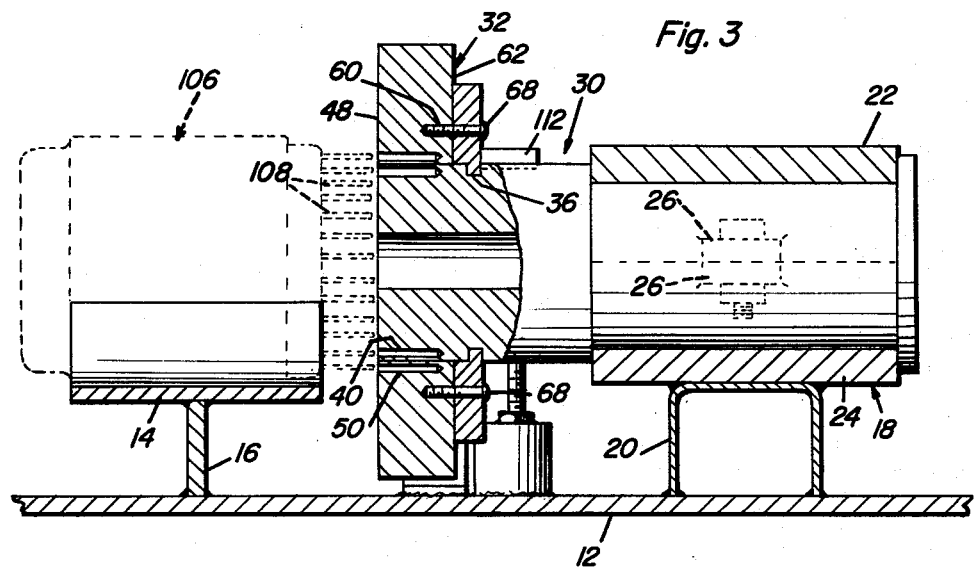
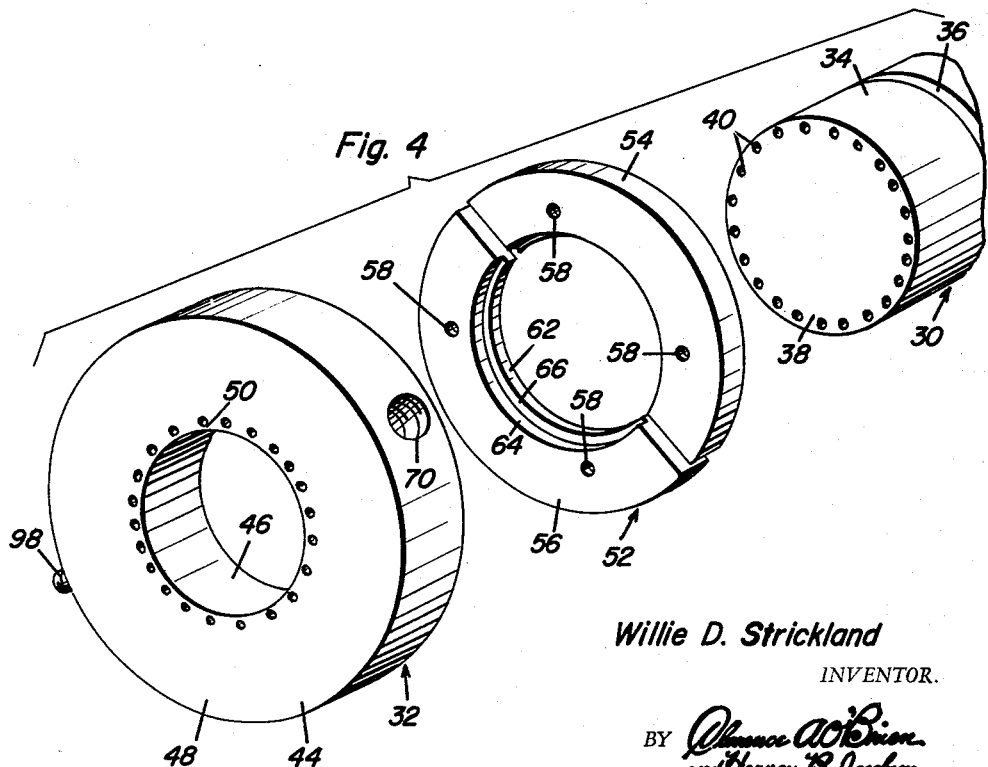
Willie D. Strickland
INVENTOR.

3,166,102
ARMATURE WINDING MACHINE
Willie D. Strickland, Box 41, Wylie, Tex.
Filed Oct. 4, 1962, Ser. No. 228,417
12 Claims. (Cl. 140—2)

This invention relates to a novel and useful armature winding machine and more specifically to a machine for assisting in the winding of armatures of the type having single turn bar conductors including parallel branches which are received by spaced slots in the armature core. The armature is provided with commutator bars with which the branches are connected and the branches of the bar conductors which are of the hairpin type are generally angularly displaced in opposite directions respectively from the core slots which contain these branches in order that the branches may be connected with the appropriate commutator bars. Inasmuch as these commutator bars are angularly displaced in opposite directions respectively from the core slots which contain the branches that are to be connected thereto, the branches of the hairpin conductors must be twisted or bent in order to angularly offset the portion of the branch which is to be connected with the corresponding core slot.

The main object of this invention is to provide a machine which will be capable of twisting the ends of the hairpin conductors simultaneously in order that these ends may be aligned radially with their proper commutator bars.

A further object of this invention, in accordance with the preceding object, is to provide a machine which may be utilized to bend each of the hairpin conductor ends in the opposite direction in order that various types of armatures may be wound on the same machine such as Ford and Chevrolet starter armatures, which armatures have their ends of hairpin conductors twisted in opposite directions.

A final object of this invention to be specifically enumerated herein is to provide an armature winding machine which will conform to conventional forms of manufacture, be of simple construction and easy to use so as to provide a device to be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the armature winding machine of the instant invention;

FIGURE 2 is a sectional view taken substantially upon the plane indicated by the section line 2—2 of FIGURE 1;

FIGURE 3 is a longitudinal vertical sectional view taken substantially upon a plane passing through the longitudinal center line of the armature winding machine;

FIGURE 4 is a fragmentary perspective view of the rotatable members of the armature winding machine; and FIGURES 5 and 6 are fragmentary views of starter armatures shown with the free ends of the hairpin conductors in various stages of being bent and offset for proper alignment with and securement to their respective commutator bars.

Referring now more specifically to the drawings the numeral 10 generally designates the armature winding machine of the instant invention. The machine 10 includes a base 12 from which a generally semicircular supporting saddle or cradle 14 is supported by means of a standard 16.

A generally cylindrical clamp assembly generally referred to by the reference numeral 18 is also supported from the base 12 by means of a support 20 and it may be seen that the longitudinal center axis of the clamp assembly 18 is aligned with the longitudinal axis of the semicylindrical saddle or cradle 14. The saddle or cradle 14 and the clamp assembly 18 are axially spaced apart. It may be seen that the clamp assembly 18 includes upper and lower semicylindrical sections 22 and 24 and that the sections 22 and 24 each include a pair of diametrically opposite apertured mounting lugs 26 which may be secured together by means of suitable fasteners 28.

First and second rotatable members generally referred to by the reference numerals 30 and 32 are provided and it may be seen from FIGURES 3 and 4 of the drawings that the first rotatable member 30 comprises a cylindrical body 34 which has a circumferential groove 36 formed therein adjacent one end 38. The end 38 of the body 34 has a plurality of axially extending and circumferentially disposed blind bores 40 formed therein and it may be seen that the blind bores 40 are spaced closely adjacent the outer periphery of the body 34. The second rotatable member 32 comprises an annulus 44 having a centrally disposed bore 46 formed therethrough. The bore 46 snugly and rotatably receives the end of the body 34 having the bores 40 formed therein and the end 48 of the annulus 44 corresponding to the end 38 of the body 44 has a plurality of blind bores 50 formed therein which extend axially of the annulus 44 and are disposed closely adjacent the bore 46 and equal in number to the bores 40.

A split ring assembly generally referred to by the reference numeral 52 is provided and includes a pair of half annular sections 54 and 56 each having a pair of bores 58 formed therethrough which are registrable with blind bores 60 formed in the end 62 of the annulus 44 remote from the end 48 thereof.

The split annulus 52 defines a bore 62 having a counterbore 64 defining a shoulder 66. The bore 62 snugly and rotatably receives the body 34 while the portions of the half annular sections 54 and 56 defined by the shoulder 66 in the bore 62 are receivable in the groove 36 formed in the body 34. Accordingly, when the split annulus 52 is engaged with the body 34 and secured to the annulus 44 by means of suitable fasteners 68 passed through the bores 58 and threadedly engaged in the bore 60, the body 34 and the annulus 44 are mounted for rotation relative to each other.

The end 38 of the body 34 and the end 48 of the annulus 44 are coplanar when the annulus and body are secured together by means of the split annulus 52. Additionally, it may be seen that the body 34 may be clamped within the clamp assembly 18. The annulus 44 is provided with a radial bore 70 which is threaded and a handle 72 is provided and threaded on one end for engagement with the bore 70. The body 34 is also provided with a radial bore that is designated by the reference numeral 74 and the handle 76 is provided and is threadedly engaged in the bore 74 which is also threaded.

A pair of stands 78 and 80 are secured to the base 12 in any convenient manner such as by welding 82 and it will be noted that the stand 78 is disposed in the plane through which the handle 72 is swingable while the stand 80 is disposed in the plane through which the handle 76 is swingable. The stands 78 and 80 are provided with adjustable stop screws 84 and 86, respectively, and may be utilized to limit swinging movement of the handles 72 and 76, respectively, in opposite directions indicated by the arrows 88 and 90 in FIGURE 2 of the drawings. Additionally, a third stand 92 is secured to the base 12 in any convenient manner such as by welding 94 and has an adjustable stop screw 96 mounted thereon which is adapted to be engaged by a radially outwardly projecting abutment 98 carried by the annulus 44 for limiting rotation of the annulus 44 in the direction opposite to the direction indicated by the arrow 88 in FIGURE 2 of the drawings.

In operation, the armature 106 may be cradled in the saddle 14 for adjusted rotated positioning about its longitudinal axis. Thereafter, the hairpin conductors 100 are secured in the slots 102 formed by the core 104 of the armature 106. Then, the armature 106 is adjustably rotatably positioned in the saddle or cradle 14 so as to align the terminal ends 108 of the hairpin conductors 100 with the bores 40 and 50 formed in the body 34 and the annulus 44. Then, the armature 106 is axially displaced until the ends 108 have been seated within the bores 40 and 50. Thereafter, the handles 72 and 76 may be swung in the directions indicated by the arrows 88 and 90, respectively, in order to twist each pair of ends 108 in each slot 102 in opposite directions in the manner illustrated in FIGURE 5 of the drawings. Thereafter, the armature 106 may be removed from the saddle 14 and the ends 108 may be urged radially inwardly and secured in the appropriate notches formed in the inner ends of the commutator bars (not shown) of the armature 106.

It is to be understood that as the handles 72 and 76 are swung in the directions indicated by the arrows 88 and 90 that the effective foreshortening of the ends of the hairpin conductors 100 will effect axial shifting of the armature 106 toward the annulus 44. However, inasmuch as this axial shifting of the armature 106 is possible, the snug fit of the ends 108 of the conductors 100 may be frictionally gripped by the bores 40 and 50 formed within the body 34 and the annulus 44 in order that the ends 108 may be retained seated within the blind bores 40 and 50.

Further, an abutment 112 carried by the second rotatable member 32 comprises an abutment engageable by the handle 76 for properly orientating the first and second rotatable members 30 and 32 relative to each other and to the stop screws 84 and 86 at the beginning of each operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A machine for bending the ends of hairpin conductors extending through the slots of an armature core, certain of said conductors being disposed in a first circle and innermost in said slots while others of said conductors are disposed in a second circle and outermost in said slots, said circles being concentric with the axis of rotation of said armature, said machine comprising two coaxial relatively rotatable members provided with closely adjacent concentric circles of inner and outer bores generally paralleling and concentric with the axis of rotation of said members and adapted to receive said ends, means connected with said members for relatively rotating said members.

2. The combination of claim 1 wherein said bores in said rotatable members open through adjacent portions of end faces thereof which are substantially coplanar.

3. The combination of claim 1 wherein said bores are blind bores of a predetermined depth so as to be adapted to receive all of the free ends of said ends of said pin conductors in excess of those portions thereof which are to be bent.

4. The combination of claim 1 wherein said rotatable members include coacting means engaged with each other preventing axial shifting of one relative to the other.

5. The combination of claim 1 wherein said machine includes means removably supporting one of said members for rotation about its axis of rotation, the other of said members being rotatably supported directly from said one member.

6. The combination of claim 1 wherein said machine includes a base from which said rotatable members are rotatably supported, said base and each of said rotatable members including coacting means for limiting rotational movement of said rotatable members in opposite directions relative to said base.

7. The combination of claim 6 including coacting means carried by on of said rotatable members and said base limiting rotational movement of said one rotatable member in the other direction.

8. The combination of claim 1 wherein said bores in said rotatable members open through adjacent portions of end faces thereof which are substantially coplanar and wherein said bores are blind bores of a predetermined depth so as to be adapted to receive all of the free ends of said ends of said pin conductors in excess of those portions thereof which are to be bent.

9. The combination of claim 1 wherein said rotatable members include coacting means engaged with each other preventing axial shifting of one relative to the other and wherein said machine includes means removably supporting one of said members for rotation about its axis of rotation, the other of said members being rotatably supported directly from said one member.

10. The combination of claim 9 wherein said bores in said rotatable members open through adjacent portions of end faces thereof which are substantially coplanar and wherein said bores are blind bores of a predetermined depth so as to be adapted to receive all of the free ends of said ends of said pin conductors in excess of those portions thereof which are to be bent.

11. A machine for bending the ends of hairpin conductors extending through the slots of an armature core, certain of said conductors being disposed in a first circle and innermost in said slots while others of said conductors are disposed in a second circle and outermost in said slots, said circles being concentric with the axis of rotation of said armature, said machine comprising two coaxial relatively rotatable members provided with closely adjacent concentric circles of inner and outer axially extending recesses generally paralleling and concentric with the axis of rotation of said members and adapted to receive said ends, and means connected with said members for relative rotation of said members.

12. A machine for bending the ends of hairpin conductors extending through the slots of an armature core, certain of said conductors being disposed in a first circle and innermost in said slots while others of said conductors are disposed in a second circle and outermost in said slots, said circles being concentric with the axis of rotation of said armature, said machine comprising two coaxial relatively rotatable members provided with closely adjacent concentric circles of inner and outer bores generally paralleling and concentric with the axis of rotation of said members and adapted to receive said ends, means connected with said members for relatively rotating said members, and means stationarily positioned relative to the axis of rotation of said members adapted to rotatably support said armature for rotation about and longitudinal axial shifting along its longitudinal center axis with said armature supported with its longitudinal center axis substantially longitudinally aligned with the axis of rotation of said rotatable members.

References Cited by the Examiner

UNITED STATES PATENTS

| 2,165,135 | 7/39 | Garner | 140—71.5 |
| 2,359,514 | 10/44 | Eitel et al. | 140—71.5 |
| 2,876,449 | 3/59 | Farmer | 242—8 |

CHARLES W. LANHAM, *Primary Examiner.*